United States Patent Office

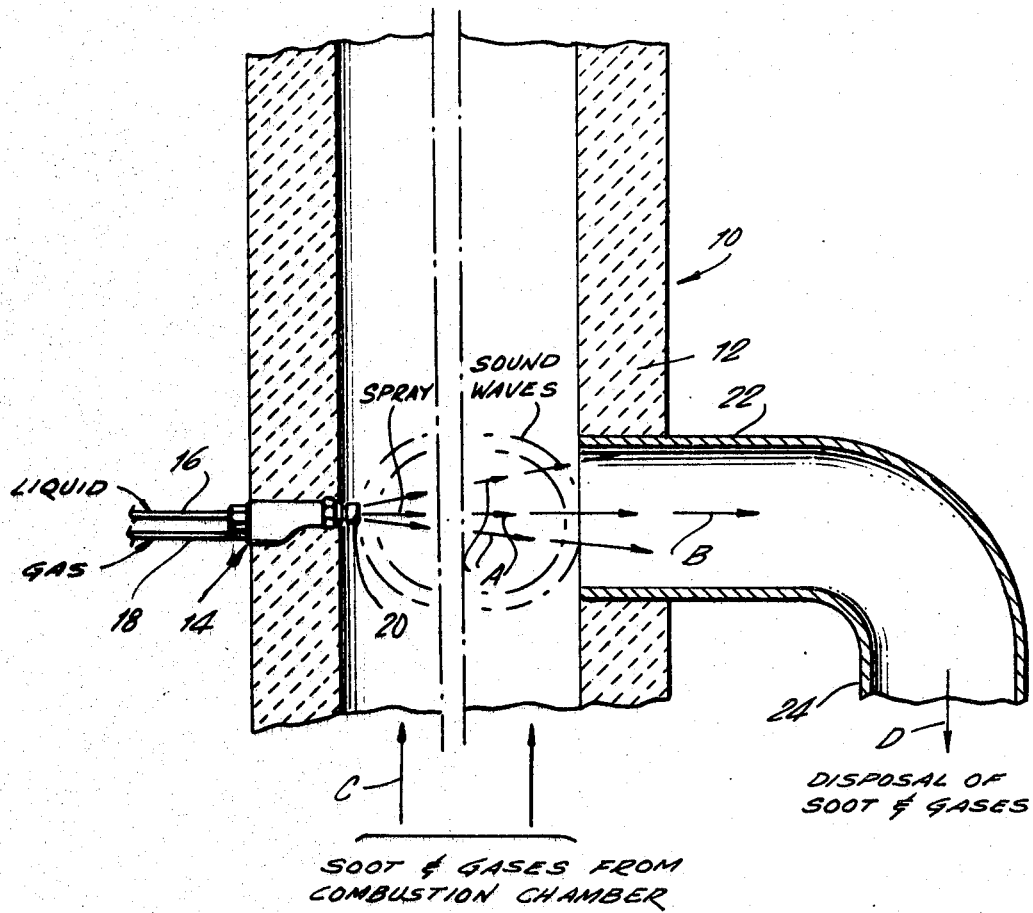

3,390,869
Patented July 2, 1968

3,390,869
SPRAY-TYPE SOOT ELIMINATOR
Howard Alliger, 10 Ponderosa Drive,
Melville, N.Y. 11746
Filed Nov. 16, 1966, Ser. No. 594,844
1 Claim. (Cl. 261—17)

ABSTRACT OF THE DISCLOSURE

A soot eliminator for removing soot and noxious material from combustion gases having a spray nozzle for simultaneously delivering compressed air, saturated steam and ultrasonic vibrations perpendicularly across the upward path of the combustion gases and into a disposal tube.

---

This invention relates to the air pollution reducing art, and more particularly to a spray-type soot eliminator.

Various types of gas scrubber and anti-pollution devices have been previously utilized in attempts to reduce air pollution arising from soot and noxious matter being disposed in the atmosphere from the combustion of various fuels or waste matter especially for industrial purposes. However, these prior art devices are usually quite complicated and expensive employing various delicate moving parts, swirls, packing wheels, filters, louvers, cyclones and other elements which generally required regular cleaning and frequent maintenance. Further, these devices did not serve to completely dispose of the soot and noxious material but merely screened part there from the atmosphere requiring other apparatus for disposal purposes.

It is therefore an object of the present invention to provide means for eliminating from combustion gases substantially all of the soot and noxious material such as sulfur dioxide while simultaneously providing a vehicle for the convenient and complete disposal thereof.

The present invention features the use of a spray which is directed across the path of the combustion gases rising up a chimney. A mist made up of very fine particles is used so that the combustion gases including the soot flow into the moving mist rather than bounce off. An application of ultrasonic energy causes the soot and noxious material to combine with the mist since the ultrasonic vibrations breaks down the surface tension of the liquid droplets and permits the furious combination of the noxious material and soot with the droplets. These droplets pass diametrically of the chimney and into a disposal tube or into a gross vertical spray for easy disposal to a sewer system.

These, together with the various ancillary objects and features which will become apparent as the following description proceeds are attained by this spray-type soot eliminator, a preferred embodiment being shown in the accompanying drawing, by way of example only, wherein the figure is a schematic vertical sectional view of the soot eliminator.

With continuing reference to the drawing as the following specification proceeds, reference numeral 10 generally designates a chimney having cylindrical walls 12 of a suitable refractory material.

Mounted in the wall 12 is a spray nozzle generally indicated at 14. In operation, a liquid such as water or saturated steam is fed in through delivery conduit 16. The water is fed at a rate of between 0.1 and 3.5 lbs. per minute. Compressed gas such as compressed air is fed through conduit 18 at a pressure ranging from 50 to 100 lbs. per square inch. The nozzle 14 is provided with an ultrasonic resonator or whistle 20 which provides for a minimum particle size and a fine mist spray. The particle size is in the order of 1–30 microns mean mass diameter and is directed in the direction of arrows A across the chimney 10 diametrically and into a delivery tube or disposal tube 22 extending horizontally and normally to the wall 12 of chimney 10. The delivery tube is diametrically opposed to nozzle 14 and is in horizontal alignment therewith so that the mist passes therethrough in the direction of arrow B. The delivery tube 22 is of uniform diameter and is mounted flush with the wall 12 of chimney 10 as shown in the drawing.

The gases of combustion from a combustion chamber disposed a few feet below the nozzle 14 rise in the direction of arrows C. The application of the ultrasonic energy not only breaks up the liquid into a very small particle size but serves to cause the mixture of the soot and noxious materials with the liquid particles such as water or water vapor and thence such particles pass through delivery pipe 24 in the direction of arrow D into a waste pool, sump, or sewer pipe 24, or other suitable ultimate disposal means.

Disposed in pipe 24 and directed downwardly or gravity fed downwardly by gross spray or waterfall, this latter spray is a stream of liquid adapted to catch the mist with entrapped soot and gases to facilitate complete absorption and disposal. The combination of combustion gases and water spray forms a solution at about room temperature. At room temperature sulfur dioxide and other noxious material is highly soluble. Accordingly, the present invention is highly effective in removing sulfur dioxide when compared to prior art devices wherein the solution temperature is higher. Further, there is no reduction in draft with the low temperature.

It will be obvious to those skilled in the art, upon studying this disclosure, that devices according to my invention can be modified in various respects and hence may be embodied in apparatus other than as particularly illustrated and described herein, without departing from the essential features of this invention and within the scope of the claim annexed hereto.

I claim:
1. A soot eliminator for removing soot and noxious material from combustion gases comprising a chimney for receiving combustion gases from a combustion chamber and for permitting said combustion gases to rise upwardly thereof, said chimney having an interior wall, a disposal tube of a uniform diameter throughout its horizontal and vertical travel mounted flush with the interior wall of said chimney and extending perpendicular outwardly of the interior of said chimney, said disposal tube extending first horizontally and then vertically, fluid disposal means depending from and connected to said disposal tube, and spray nozzle means including a resonator mounted in said nozzle at the discharge end thereof, said spray nozzle means mounted in said wall of said chimney and spaced from and in horizontal alignment with said disposal tube, means for simultaneously delivering a gas including compressed air, saturated steam including fine droplets of water of a size of 1 to 50 microns, and ultrasonic vibrations into said nozzle means and said chimney under pressure and perpendicularly across the upward path of said combustion gases directly into said disposal tube, said ultrasonic vibrations dispersing the fine droplets of water into finely divided particles for forming a fine mist for separating soot and noxious material from said combustion gases and for directing and carrying said soot and noxious material into said disposal tube.

References Cited
UNITED STATES PATENTS
771,406 10/1904 Willett _____ 261—17 X
967,135 8/1910 Lachance.
2,300,761 11/1942 Amy _____ 55—277 X
2,935,375 5/1960 Boucher.

FOREIGN PATENTS
1,063,578 8/1959 Germany.

RONALD R. WEAVER, *Primary Examiner.*